United States Patent [19]

Suzuki et al.

[11] Patent Number: 5,519,741
[45] Date of Patent: May 21, 1996

[54] SYSTEM FOR INSPECTION AND MENDING IN A REACTOR VESSEL OF A NUCLEAR REACTOR

[75] Inventors: Masanori Suzuki; Shigeru Kajiyama, both of Hitachi; Yuji Hosoda, Shimoinayoshi; Ren Morinaka, Hitachi, all of Japan

[73] Assignee: Hitachi, Ltd., Tokyo, Japan

[21] Appl. No.: 288,307

[22] Filed: Aug. 10, 1994

[30] Foreign Application Priority Data

Aug. 20, 1993 [JP] Japan .................................... 5-206063

[51] Int. Cl.⁶ .................................................. G21C 17/00
[52] U.S. Cl. .......................... 376/249; 376/252; 376/258; 376/260; 376/205
[58] Field of Search ..................................... 376/260, 249, 376/205, 252, 258; 976/DIG. 212, DIG. 213; 81/65.2, 100; 174/15.7

[56] References Cited

U.S. PATENT DOCUMENTS

| | | | |
|---|---|---|---|
| 4,311,556 | 1/1982 | Iwamoto et al. | 376/249 |
| 4,496,519 | 1/1985 | McGuire | 376/316 |
| 4,584,166 | 4/1986 | Greacen | 376/260 |
| 4,684,492 | 8/1987 | Kune et al. | 376/203 |
| 4,839,495 | 6/1989 | Kitera et al. | 219/121.63 |
| 5,145,637 | 9/1992 | Richardson et al. | 376/249 |

FOREIGN PATENT DOCUMENTS

| | | |
|---|---|---|
| 2-116747 | 5/1990 | Japan . |
| 3-261897 | 11/1991 | Japan . |
| 5-80186 | 4/1993 | Japan . |

*Primary Examiner*—Donald P. Walsh
*Assistant Examiner*—Meena Chelliah
*Attorney, Agent, or Firm*—Fay, Sharpe, Beall, Fagan, Minnich, & McKee

[57] ABSTRACT

A system for inspection and mending in a reactor vessel of a nuclear reactor comprises a track mechanism, support mechanisms for supporting the track mechanism, an inspection apparatus traveling on the track mechanism, at least one mending apparatus traveling on the track mechanism, a setting mechanism for lowering all the above-described mechanisms and apparatus in the reactor vessel, each of which is composed so as to pass through a hole of an upper grid of a reactor, and an installing mechanism for positioning the support mechanisms fixed with two of the upper grid, a core support plate and internal structures below the core support plate and the track mechanism at the inside of the reactor vessel by remote control and for attaching the inspection apparatus and the mending apparatus to the same track mechanism by remote control. The position data of places to be mended are obtained by the inspection apparatus and transmitted as the target position data to a mending control apparatus for controlling the mending apparatus.

12 Claims, 6 Drawing Sheets

SYSTEM FOR INSPECTION AND MENDING IN A REACTOR VESSEL OF A NUCLEAR REACTOR

BACKGROUND OF THE INVENTION

1. Field of the Invention

The present invention relates to a system for inspecting and mending welded parts and heat-affected zones of a reactor vessel and internal structures thereof, particularly to an inspection and mending system preferably used in places of a wide region to which the entrance of access is very narrow.

2. Description of the Related Art

A conventional inspection apparatus for the welded parts of an outer surface of a shroud in a reactor vessel is described in Japanese Patent Application Laid-Open No. 116747/1990.

A conventional mending apparatus for an inner surface of a shroud in a reactor vessel is described in Japanese Patent Application Laid-Open No. 80186/1993.

In the former conventional inspection apparatus, only inspection of the welded part at the inner face of a reactor vessel is executed but mending of the welded parts based on the inspection results is not presented.

Downsizing of the inspection or the mending apparatus is required since the space outside the shroud of the reactor vessel is very narrow. The inspection at the narrow space is comparatively easy since only insertion of a probe is needed. However, as for the mending apparatus, there has been a problem that the defect can not be mended since downsizing of the mending apparatus is difficult and the mending apparatus hardly gets near the defect even if a defect is detected. In order to avoid the problem, it is necessary to use the mending apparatus from the inside of the shroud but this mending method is difficult in case visual observation of the defect is not possible and positioning at the place to be mended is difficult. Positioning the mending apparatus at the maintained place by visual observation is impossible if the defect is not considerably large.

The latter conventional mending apparatus has a problem that its positioning is difficult since vibration by deflection of its arm with more than 3 m of length occurs in movement of the arm and three-dimensional positioning is further needed in every movement of the arm.

Furthermore, the conventional inspection and the conventional mending apparatus can not get near the inner face of the shroud or the shroud support if the apparatus can not pass through a hole of the upper grid or the core support plate when occasion demands. Therefore, each of the apparatuses needs to be independently composed since the size of those apparatuses must be designed in a smaller size than the hole width of the upper grid. And another problem is that it is difficult to transfer the defect position data detected by the inspection apparatus to the mending apparatus in maintenance by the conventional inspection and the conventional mending apparatus, which makes the mending of the detected defect very difficult.

SUMMARY OF THE INVENTION

Objects of the Invention

The present invention has been achieved in consideration of the above-described problems, and is aimed at providing a system for inspection and mending in a reactor vessel of a nuclear reactor which is capable of positioning a mending apparatus at the place of a defect detected by an inspection apparatus even in such a place as a region inside the shroud with a narrow entrance.

Methods Solving the Problems

The first feature of the present invention is to provide a system for inspection and mending in a reactor vessel of a nuclear reactor comprising; a track mechanism; support mechanisms for supporting the track mechanism; an inspection apparatus traveling on the track mechanism; at least one mending apparatus traveling on the track mechanism; a setting mechanism for lowering all the above-described mechanisms and apparatuses in the reactor vessel, each of the track mechanism, the support mechanisms, the inspection apparatus and the mending apparatuses being composed so as to pass through a hole of an upper grid of a reactor core; and an installing mechanism for positioning the support mechanisms and the track mechanism inside the reactor vessel by remote operations and for attaching the inspection apparatus and the mending apparatus to the same track mechanism by remote operations.

The second feature of the present invention is to provide a system for inspection and mending in a reactor vessel of a nuclear reactor comprising; support mechanisms, each of the support mechanisms being fixed with a hole of an upper grid and a hole of a core support plate; a track mechanism supported by the support mechanisms; an inspection apparatus and at least one mending apparatus traveling on the tracking mechanism; and a control apparatus for calculating target positions of places to be mended by using inspection result data by the inspection apparatus and for positioning the mending apparatus at the calculated target positions of places to be mended.

The third feature of the present invention is to provide a system for inspection and mending in a reactor vessel of a nuclear reactor comprising; support mechanisms, each of the support mechanisms being fixed with a core support plate and one of internal structures below the core support plate; a track mechanism supported by the support mechanisms; an inspection apparatus and at least one mending apparatus traveling on the tracking mechanism; and a control apparatus for calculating target positions of places to be mended by using inspection result data by the inspection apparatus and for positioning the mending apparatus at the calculated target positions of places to be mended.

DETAILED DESCRIPTION OF THE EMBODIMENTS

Hereinafter, details of the present invention is explained based on embodiments referring to drawings.

Figure 1:
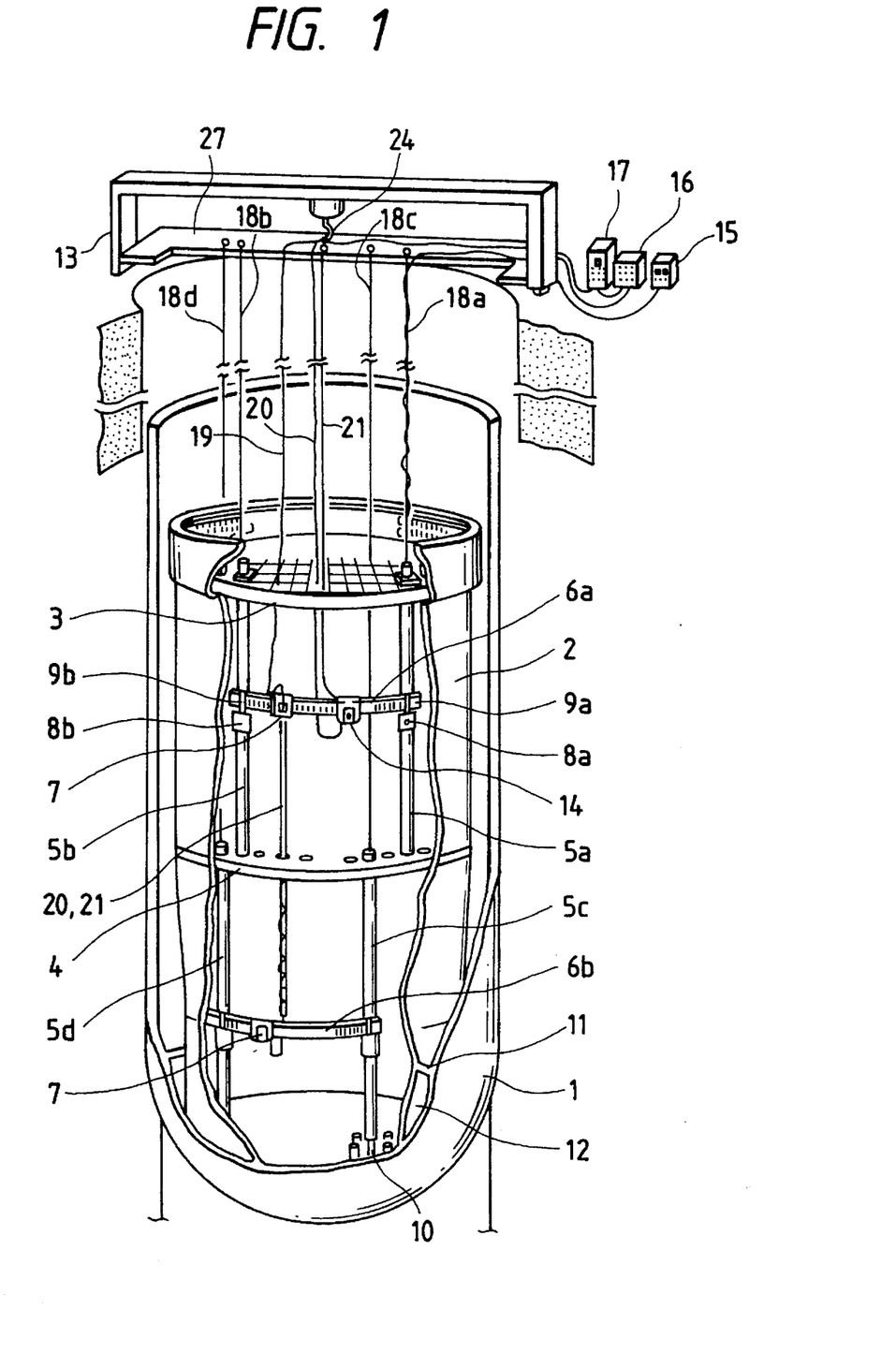
FIG. 1 is a partially cross sectional perspective view of a rector vessel in which a system of an embodiment by the present invention is installed.

In FIG. 1, internal structures of a reactor vessel are shown by a partially cross sectional perspective view showing only a shroud 2, an upper grid 3, a core support plate 4, control rod drive mechanism housings 10 and a shroud support 11 which directly relate to the present invention. And such internal structures inside the reactor vessels as a steam dryer, a steam separator, a shroud head, fuel assemblies, a control rod drive mechanism and so on are removed since they hinder inspection and mending work.

As to guide tubes of control rod drive mechanisms, neutron monitoring instrumentation tubes, etc. although only the ones at the neighborhood of the place to be inspected and mended have to be removed, those are not shown in the figure for simplicity of the figure.

Firstly, the system configuration of an embodiment for maintaining the region shown in the figure of the shroud is explained. The system of the embodiment comprises a track mechanism 6a, support mechanisms 5a and 5b, a setting mechanism 13, an inspection apparatus 7, a mending apparatus 14, an installation control apparatus 15 for controlling the support mechanisms 5a and 5b and the setting mechanism 13, an inspection control apparatus 17 for controlling the inspection apparatus 7, and a mending control apparatus 16 for controlling the mending apparatus 14.

The top and the bottom of each of the support mechanisms 5a and 5b are positioned and supported by a hole of the upper grid and a hole of the core support plate, respectively, as well as a fuel assembly.

The top and the bottom of the support mechanism 5a are tapered and a locking device 30 operated by a pneumatic cylinder is attached to its top, a clamping device 8a to its intermediate place, and a collar to its bottom.

The clamping device 8a is movable in the vertical direction of the support mechanism 5a and connected to the support mechanism 5a so as to be fixed at an optional place. The clamping device 8a has a clamping pawl 9a for fixing the track mechanism 6a.

A tube for sending air to the pneumatic cylinders of the locking device 30 and the clamping device 8a passes through the inside of the support mechanism 5a, goes out from the top of the support mechanism 5a and is connected to the installation control apparatus 15 provided on a service platform of an reactor upper part.

The clamping device 8b has the same constitution as the clamping device 8a.

The track mechanism 6a is fixed by the clamping pawls 9a and 9b of the clamping devices 8a and 8b and supported by the support mechanisms 5a and 5b. The height from the core support plate 4 at which the track mechanism 6a is fixed can be adjusted by changing the places of the clamping device 8a and 8b along with the support mechanism 5a and 5b. Therefore, it is possible to set the track mechanism 6a at the predetermined place to be maintained by manual operations.

Figure 8:
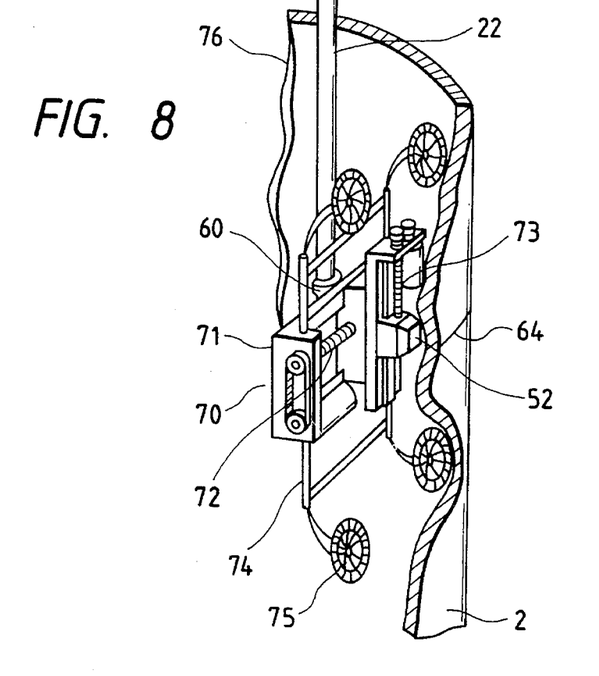
FIG. 8 is a perspective view of another inspection apparatus used in advance in the embodiment.

The height at which the clamp devices 8a and 8b are fixed to the support mechanisms 5a and 5b, that is, the place to be maintained, is predetermined by ultrasonic inspection with another inspection apparatus 70 different from the inspection apparatus 7, as shown by FIG. 8.

The inspection apparatus 70 comprises a frame 71, an X direction drive mechanism, a Z direction drive mechanism, an ultrasonic probe 52, four legs 74 and four suction cups 75.

The X direction drive mechanism is attached to the frame 71 and moves the inspection apparatus 70 in the circumferential direction.

The Z direction drive mechanism is attached on the X direction drive mechanism and moves the inspection apparatus 70 in the z direction, namely, the vertical direction. The X and Z direction drive mechanisms 72 and 73 are composed, for example, by a step motor, a timing belt and a ball thread.

The ultrasonic probe 72 is attached to the X direction drive mechanism and the non destructive inspection of the shroud wall can be done by using combinational motion of the X and Z drive mechanisms 72 and 73 and making the probe 72 crawl on the shroud wall.

The four legs 74 are provided at the side of the frame 71, and, to the tops of the four legs 74, the suction cups 75 are attached. By those suction cups 75, the inspection apparatus 70 can stick to the shroud wall.

At the upper face of the frame 71, a pole connection cylinder 60 connected to a manipulation pole 22, cables used for controlling the two drive mechanisms and tubes 76 used for operating suction cups are provided.

The inspection apparatus 70 is supported and lowered into the reactor vessel by the manipulation pole 22. Further, the inspection apparatus 70 passes through a hole of the upper grid 3, is stuck to the neighborhood of the place to be inspected or mended by use of the manipulation pole 22, and inspects the presence of defects. If any defect is detected, the approximate position of the mended place is determined based on the operated length of the manipulation pole 22 and the driven distances of the two drive mechanisms 72 and 73. And the clamping devices 8a and 8b are fixed to the support mechanisms 5a and 5b at the height corresponding to the determined position. In the embodiment, although the positioning of the clamping mechanisms 8a and 8b is done by manual operations for simplicity of the apparatus, the clamping mechanisms 8a and 8b can be lowered or lifted also by electric operations along the support mechanisms 5a and 5b, respectively. The electric operations has the advantage that it is possible to extend the maintained region in the vertical direction without taking in and out the track mechanism.

As shown in FIG. 1, the inspection apparatus 7 and the mending apparatus 14 are provided so as to be capable of traveling on the track mechanism 6a, and control cables 19 and 20 are connected to the inspection apparatus 7 and the mending apparatus 14, respectively. Further, the control cables 19 and 20 are connected to the inspection control apparatus 16 and the mending control apparatus 17, respectively, via the holes of the upper grid 3 and the setting mechanism 13.

Taking out the mending apparatus 14 from the reactor vessel is done by a suspension wire 21 provided above the reactor vessel. On the other hand, the inspection apparatus 7 can be taken out from the reactor vessel by the manipulation pole 22 not shown in FIG. 1. Details of the structures and the mounting and dismounting procedures of the inspection apparatus 7 and the mending apparatus 14 are described later.

However, it is important that all sizes of each horizontal sectional shape of the support mechanisms 5a and 5b including the clamping devices 8a and 8b, the vertical sectional shape of the track mechanism 6a and each cross sectional shape of the inspection apparatus 7 and the mending apparatus 14 are adjusted so as to be capable of passing through a hole of the upper grid 3.

Nextly, details of the structure of the setting mechanism 13 and setting procedures of the mechanisms and the apparatuses by the setting mechanism 13 are explained.

Figure 2:
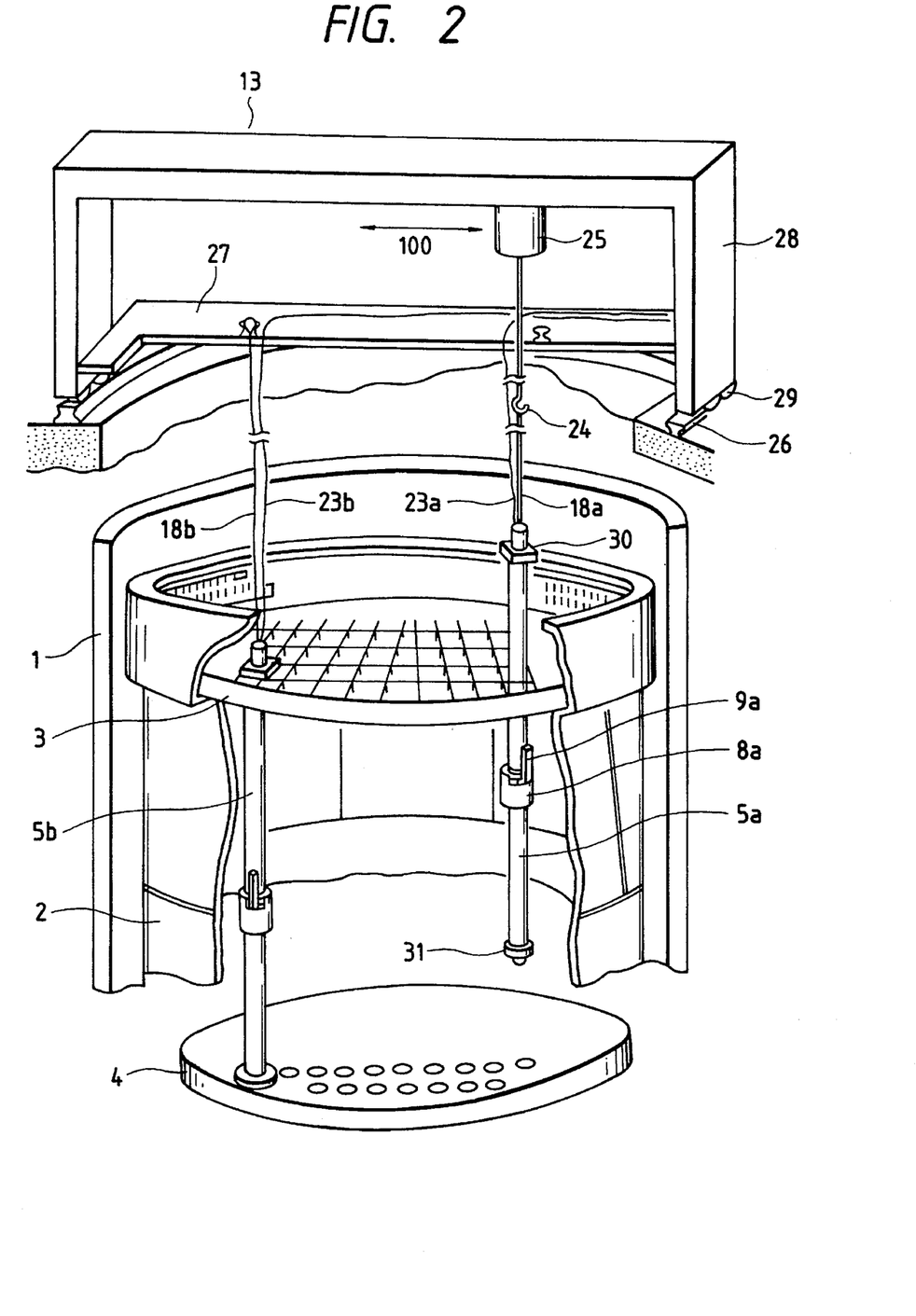
FIG. 2 is a partially cross sectional perspective view of a reactor vessel at the first step of the procedure of installing the system shown by FIG. 1.
Figure 3:
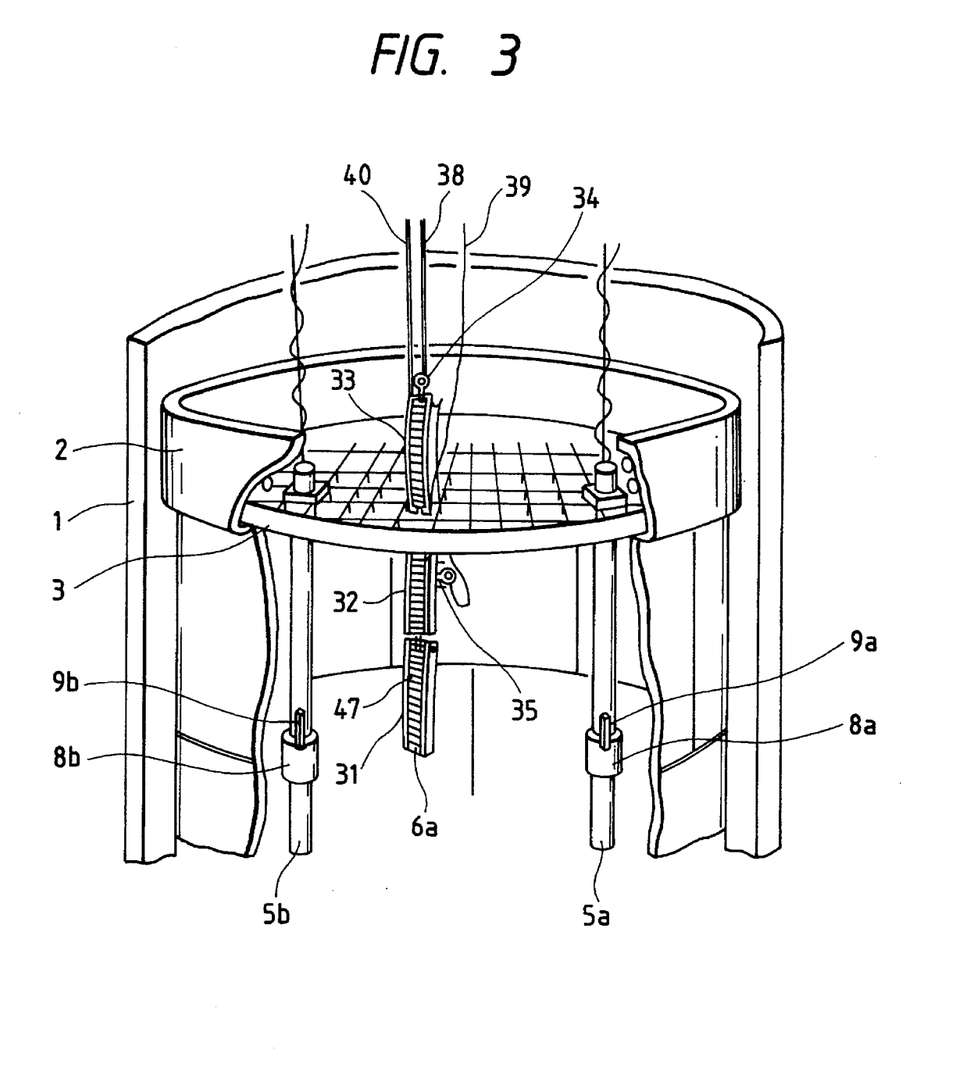
FIG. 3 is a partially cross sectional perspective view of a reactor vessel at the second step of the procedure of installing the system shown by FIG. 1.
Figure 4:
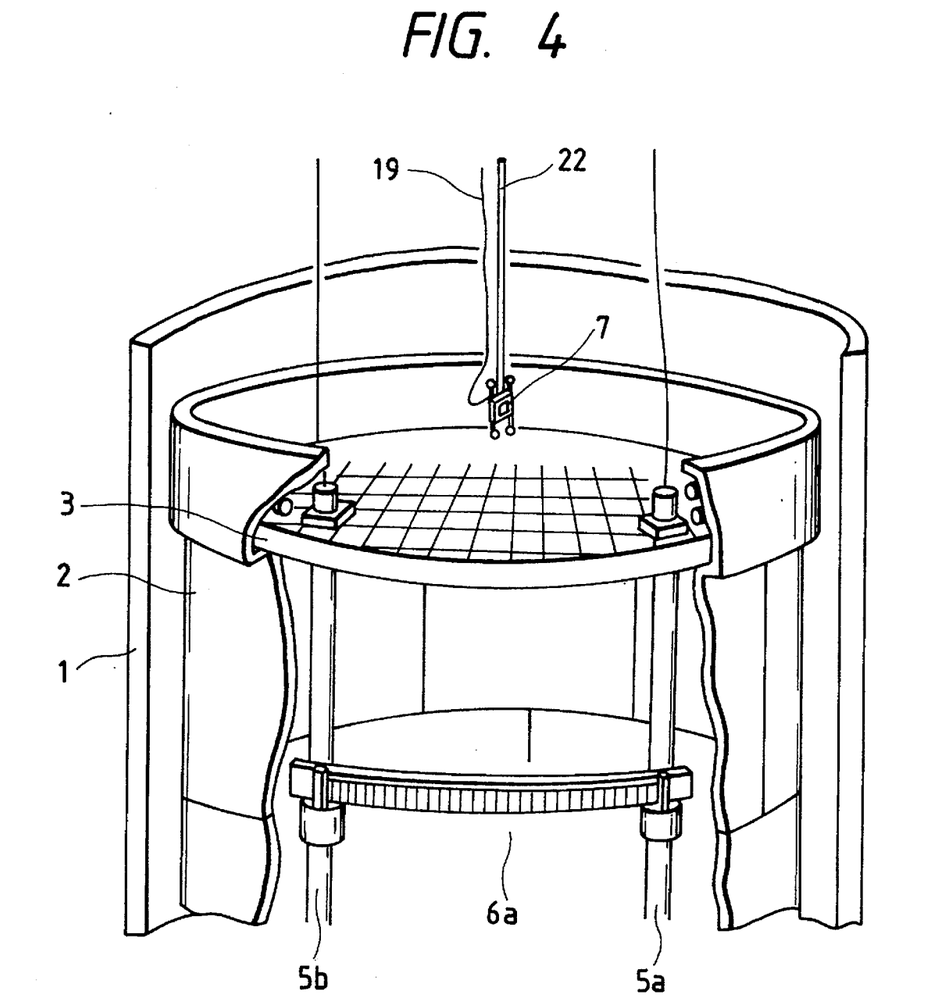
FIG. 4 is a partially cross sectional perspective view of a reactor vessel at the third step of the procedure of installing the system shown by FIG. 1.

FIGS. 2–4 indicate the setting situations of the support mechanisms 5a and 5b, the track mechanism 6a and the inspection apparatus 7, respectively. And the setting of mechanisms and apparatuses is executed in the order of the shown figures. That is, firstly, the support mechanisms 5a and 5b are set, nextly, the track mechanism 6a, and lastly, the inspection apparatus 7 and then the mending apparatus 14. The setting operations are done under the conditions that the reactor vessel is filled up with water and a water-proof television camera is set in the reactor vessel. The explanation of observation by the television camera is abridged.

In FIG. 2, the detailed constitution of the setting mechanism 13 is shown. The setting mechanism 13 has a gate type frame structure and comprises a gate frame 28, a pedestal 27, a suspension mechanism 25, a hook 24, wheels 29 and a rail 26.

The pedestal 27 is provided at the intermediate height position of the gate frame 28 and used for a worker's observation of setting situations of the mechanism or apparatus in the reactor vessel, as a scaffolding for fine position adjustment work in setting mechanisms or apparatuses by the manipulation pole, or for fixing the wires 18a–18d.

The setting mechanism 13 is laid on the rail 26 via the wheels 29 attached to the legs of the gate frame and can rotated on the outside of the circumference of the reactor core since the rail 26 is provided in a circular form around the upper opening of the reactor vessel and the center axis of the rail 26 is on the same center axis of the reactor core in the reactor vessel.

The suspension mechanism 25 is provided at the upper place of the gate frame 28 so as to be capable of horizontally moving in the direction 100 shown in FIG. 2 between the two side legs of gate frame 28.

The position of the suspension mechanism 25 can be set at an optional point in the horizontal sectional plane of the reactor core by the rotation of the setting mechanism 13 and the horizontal motion of the suspension mechanism 25.

The hook 24 is attached to the bottom of the suspension mechanism 25 and used for lowering and lifting the support mechanisms 5a and 5b.

In the following, setting procedures of the support mechanisms 5a and 5b are explained. However, the procedures only for the support mechanism 5a are explained and those for the mechanism 5b are abridged, since the both of the procedures are almost the same.

The setting mechanism 13 is rotated and the suspension mechanism 25 is horizontally moved so that the support mechanism 5a comes to the point where it is to be positioned. Since the support mechanism 5b is already set in the case shown in FIG. 2, the rotation of the setting mechanism should be done as adjusting the length of the wire 18b connected to the support mechanism 5b, that is, extending it so as not to pull it.

After the suspension mechanism 25 is horizontally positioned, the lower terminal of the wire 18a is connected to the top of the support mechanism 5a, and the upper terminal of the wire 18a to the hook 24.

By operating the suspension mechanism 25, the support mechanism 5a is lowered until the bottom of the support mechanism 5a comes down near the upper grid 3. The bottom of the support mechanism 25 is tapered so as to easily be inserted into a hole. Then, the positions of the setting mechanism 13 and the suspension mechanism 25 are finely adjusted so that the bottom of the support mechanism 5a is inserted into a hole of the upper grid. After the bottom of the support mechanism 5a is inserted into a hole of the upper grid 3, the support mechanism 25 is again lowered near the core support plate 4. Then, the bottom of the support mechanism 5a can be inserted into a hole of the core support plate 4 by only minute position adjustment of the wire 8a by using the manipulation pole, etc. since the position of the bottom of the support mechanism 5a is generally almost coincident with that of the hole of the core support plate 4 in the above-mentioned state.

Then, the locking device 30 of the support mechanism 5a is rotated so as to fit into the hole of the upper grid 3. The support mechanism 5a is lowered until the collar attached to the neighborhood of the bottom of the support mechanism 5a contacts the core support plate 4. Then, the support mechanism 5a is fixed to the upper grid 3 by operating the locking device 30.

In the following, the structure and the setting procedures of the track mechanism 6a is explained.

Figure 5:
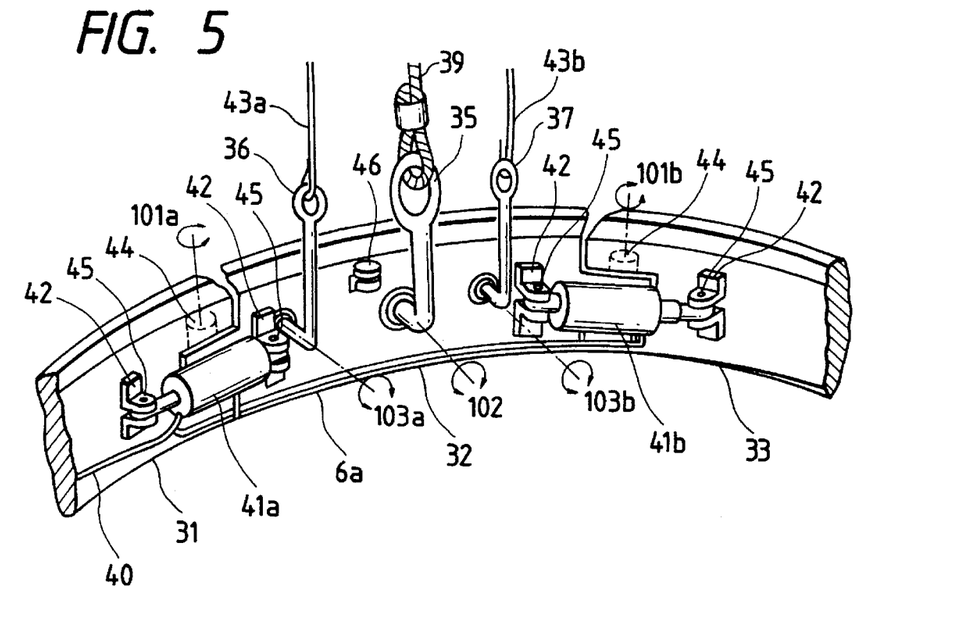
FIG. 5 is a perspective view of a track mechanism in the intermediate step of assembling procedure thereof.

The track mechanism 6a has a circular arch shape as shown in FIGS. 3 and 5, and a rack 47 for moving the inspection apparatus 7 and the mending apparatus 14 is provided at the outside face of the circular arch. And a suspending device 34 is attached to the terminal of the track mechanism 6a. The track mechanism 6a comprises three divided partial track mechanisms 31, 32 and 33 with a circular arch shape connected to each other by two axes 44 and has two hydraulic cylinders 41a and 41b for rotating the partial track mechanisms on each of the axes 44. And suspending devices 35, 36 and 37 used for setting the track mechanisms are attached to the partial track mechanism 32.

In the following, rotation on the axis 44 of the partial track mechanism is explained.

The partial track mechanisms 31 and 33 are composed so as to be capable of rotating in the outside direction of the partial track mechanism 32. As to the rotation in the inside direction, stoppers not shown in the figures are provided at the hydraulic cylinders 41a and 41b so as the partial track mechanisms do not rotate more inside than the partial track mechanisms 31, 32 and 33 form a circular arch as a whole.

Since the partial track mechanisms of the track mechanism 6a can be extended in a line as shown in FIG. 3 by the above-mentioned structure, the track mechanism 6a can pass through a hole of the upper grid 3 and is formed as a circular arch again as shown in FIG. 4 by operating the hydraulic cylinders 41a and 41b.

The above-mentioned rotation can be done by remote control operations using the mechanism described in the following.

As shown in FIG. 5, two bearing blocks 42 are attached to the neighboring terminal parts of the partial track mechanisms 31 and 32, and the bearing blocks 42 support the hydraulic cylinder 41a and rotate on the axis 44 in the direction 101a shown by an arrow via axes 45. Also to the neighboring terminal parts of the partial track mechanisms 32 and 33, the hydraulic cylinder 41b is attached via two bearing blocks 42.

A tube 40 is connected to the hydraulic cylinders 41a and 41b and the other terminal of the tube 40 is connected to the installation control apparatus 15 which operates the hydraulic cylinders 41a and 41b by remote control. That is, the track mechanism 6a is formed as a line or a circular arch by the remote control operations.

In the following, the suspension devices 35, 36 and 37 used for setting mechanisms and apparatuses are explained.

The suspension device 35 has an L-shaped structure. A wire 39 is connected to one side of the suspension device 35 and the other side of the suspension device 35 to the partial track mechanism 32. The connection part of the suspension device 35 and the partial track mechanism 32 is composed so as the terminal of the suspension device 35 is rotatable on the normal axis to the inside face of the circular arch of the partial track mechanism 32 in the direction 102 shown by an arrow and the normal axis passes through the center of gravity of the track mechanism 6a.

The suspension devices 36 and 37 have also an L-shaped structure. Each of wires 43a and 43b is connected to one side of each of the suspension devices 36 and 37, respectively, and the other sides of the suspension devices 36 and 37 to the partial track mechanism 32. Each connection part of the suspension device 36 or 37 to the partial track mechanism 32 is composed so as each terminal of the suspension device 36 or 37 is rotatable on the normal axis to the inside face of the circular arch in the direction 103a or 103b shown by arrows. In the embodiment, the distance between the wires 43a and 43b is set more narrow than the hole width of the upper grid in order to prevent the suspension wires from adding unnecessary force to the upper grid in the later-mentioned rotating operations of the track mechanism 6a.

In the following, the setting method of the track mechanism 6a is explained.

The track mechanism 6a as well as the support mechanisms 5a and 5b is suspended into the reactor vessel by using wires and the setting mechanism 13. In this step, the track mechanism 6a is formed as a line by the hydraulic cylinders 41a and 41b and the wires 39, 43a and 43b are slackened.

The track mechanism 6a is lowered and passes through the hole of the upper grid 3 by the wire 38. After the track mechanism 6a passes through the upper grid 3, the wire 39 is gradually lifted so as to support the whole weight of the track mechanism 6a. Even after the track mechanism 6a is held in the horizontal state, the wire 38 is completely slackened so as the weight of the track mechanism 6a is not added to the wire 38. In this step, the suspension device 36 is under the suspension device 35.

Then, the track mechanism 6a is rotated on the center axis of the terminal part of the suspension device 35 connected to the partial track mechanism 32 in the direction 102 shown by an arrow by gradually lifting the wire 43a connected to the suspension device 36. In this operations, the weight added to the wire 43a is almost only that of the wire 43a since the rotation center axis passes through the center of gravity of the track mechanism 6a and only the small rotation momentum is needed. This rotation by the wire 43a is continued until the track mechanism 6a almost gets horizontal. Then, the track mechanism 6a is held in the completely horizontal state by using also the wire 43b together. The horizontal state is confirmed by monitoring a level meter 46 attached on the upper face of the track mechanism 6a with a television under water not shown in the figure.

Then, the track mechanism 6a is mounted on the clamping devices 8a and 8b and fixed to the support mechanisms 5a and 5b by operating the clamp pawls 9a and 9b by the hydraulic cylinders.

In the following, the structures of the inspection apparatus 7 and the mending apparatus 14 are explained. Then, the method of setting the apparatus to the track mechanism 6a is explained by taking the mending apparatus 14 as an example.

Figure 6:
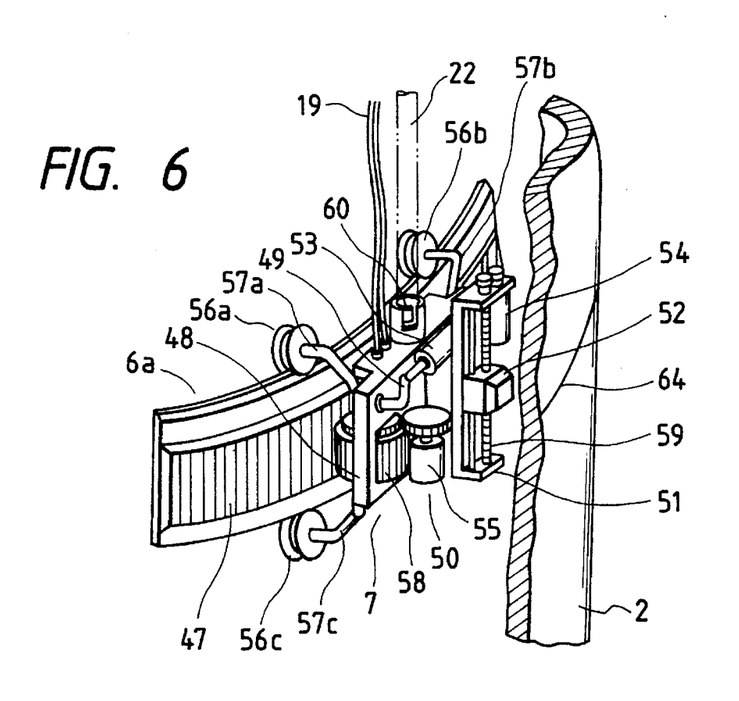
FIG. 6 is a perspective view of an inspection apparatus attached to the track mechanism.

As shown in FIG. 6, the inspection apparatus 7 comprises a frame 48, a clamping device 49, a travel device 50, a scanner 51, a probe 52 and a cable 19. The clamping device 49 attached to the frame 48 comprises a pneumatic cylinder 53, links 57a, 57b, 57c and 57d (not shown in the figure) and wheels 56a, 56b, 56c and 56d (not shown in the figure).

The links 57c and 57d are fixed to the bottom of the frame 48 and the wheels 56c and 56d are attached to the other terminal parts of the links 57c and 57d, respectively. The rings of the wheels 56c and 56d have an intaglio structure and fit to the bottom circumference of the track mechanism 6a.

The links 57a and 57b are connected to the pneumatic cylinder 53 via the upper part of the frame 48 and the wheels 56a and 56b are attached to the other terminal parts of the links 57a and 57b, respectively. The rings of the wheels 56a and 56b have also an intaglio structure and fit to the bottom circumference of the track mechanism 6a. The wheels 56a and 56b can be moved upward or downward by operating the links 57a and 57b by the cylinder 53. By moving the wheels 56a and 56b downward, the inspection apparatus 7 is clamped to the track mechanism 6a so as to be capable of traveling on the track mechanism 6a.

The moving of the inspection apparatus 7 on the circumference of the track mechanism 6a is done by the travel device 50. The travel device 50 comprises a motor 55, a pinion 58 and a pair of gears transmitting the rotation of the motor 55 to the pinion 58. The pinion 58 is fitted to the rack 47 of the track mechanism 6a in clamping the inspection apparatus 7 to the track mechanism 6a. Then, the inspection apparatus 7 gets movable on the circumference of the track mechanism 6a by the rotation of the motor 55.

The scanner 51 is provided for moving the probe 52 in the vertical direction by using a motor 55, which inspects the heat-affected zones near weld lines by ultrasonic wave. Converting the rotation of the motor 54 to the vertical motion of the probe 52 is realized by using a pair of a gear and a ball thread.

The motors, the probe and the position sensor not shown in the figure are connected to the inspection control apparatus 17 by the cable 19 which controls the ultrasonic inspection by remote operations. And a pole connection pipe 60 into which the manipulation pole 22 is fitted is provided on the top of the frame 48 and used for setting the inspection apparatus 7.

In the following, the method of setting the inspection apparatus 7 to the track mechanism 6a is explained.

FIG. 4 shows the situations that the manipulation pole 22 is connected to the inspection apparatus 7 and the inspection apparatus 7 is being lowered in the reactor vessel. As shown in FIG. 4, the inspection apparatus 7 is manipulated by controlling the pneumatic cylinder 53 so that the wheels 56a and 56b are held inside the frame 48 and the inspection apparatus 7 can pass through a hole of the upper grid 3. That is, the four links for supporting the four wheels are moved by the pneumatic cylinder 53 so as to be arranged in the vertical direction.

By operating the manipulation pole 22, the inspection apparatus 7 is passed through a hole of the upper grid 3 and positioned near the track mechanism 6a.

Then, after the wheels 56c and 56d are fitted to the bottom circumference of the track mechanism 6a by using the manipulation pole 22, the wheels 56a and 56b are clamped to the top circumference of the track mechanism 6a by operating the pneumatic cylinder 53. And the motor 55 is slowly rotated for smoothly engaging the pinion 58 into the rack 47.

Figure 7:
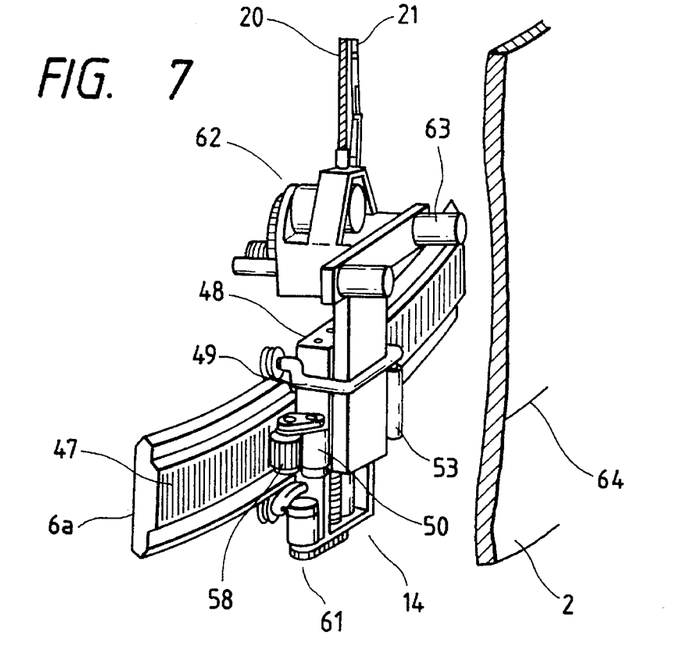
FIG. 7 is a perspective view of a mending apparatus attached to the track mechanism.

In the following, referring to FIG. 7, the mending apparatus 14 is briefly explained by taking the mending apparatus for cutting work by electrical discharge machining as an example. However, the present invention is not restricted to the mending apparatus for cutting work by electrical discharge machining but applicable to a mending apparatus for grainding work or welding work.

The mending apparatus 14 comprises a frame 48, a clamping device 49, a travel device 50, a Z direction drive mechanism 61, a R direction drive mechanism 62 and a electrode for electric discharge machining 63. Now, Z and R mean the Z and the R axis, respectively, in the circular cylindrical coordinate system where the Z axis corresponds to the vertical center axis of the core and the R axis corresponds to the axis horizontally extending from the vertical center axis to the circumference of the circular arch of the track mechanism 6a.

Controls of the mending apparatus 14 such as the portioning of the clamping device 49, the travel device 50, the Z direction drive mechanism 61 and the R direction drive mechanism 62, the discharge voltage control of a electrode for electric discharge machining 63 and so on are executed by the mending control apparatus 16 set on the service platform via a control cable 20 connected between the mending apparatus 14 and the mending control apparatus 16.

The clamping device 49 and the travel device 50 as well as those of the inspection apparatus 7 have the functions of clamping the mending apparatus 14 to the track mechanism 6a moving the mending apparatus 14 on the circumference of the track mechanism 6a, respectively. Although the clamping device 49 moves the upper wheels by the pneumatic cylinder 53 in the same way as the inspection apparatus 14, the wheels are not moved in the vertical direction but in the outside direction of the circular arch of the track mechanism 6a.

Although the travel device 50 has the pinion 58 gearing with the rack of the track mechanism 6a in the same way as the inspection apparatus 14, the rotation of the motor is not transmitted to the pinion 58 by a gear train but by a timing belt. A torque transmitting means is not restricted to the above-mentioned means but such a conventional means as a chain transmission is also applicable.

The Z direction drive mechanism 61 is attached to the frame 48 and driven by a pair of a motor and a ball thread. The R direction drive mechanism 62 is mounted on the Z direction drive mechanism 61 and driven in the R direction also by a pair of a motor and a ball thread.

The electrode 63 has the two cylinder-shaped structure and is attached to the Z direction drive mechanism.

By the above-mentioned two drive mechanisms 61 and 62, and the track mechanism 6a, the electrode 63 can be set at an optional position (R, θ, Z) in the circular cylindrical coordinate system. In the embodiment shown by FIG. 7, after the electrode 63 is positioned in the θ and the Z coordinate, the electric discharge machining is executed by applying position control in the R direction using the automatic discharge voltage control (AVC). By the machining, a pair of holes are dug at the face of the shroud.

The setting method of the mending apparatus 14 to the track mechanism 6a is almost the same as that of the inspection apparatus 7. However, the mending apparatus 14 is not supported by a manipulation pole but by the wire 21 since the positioning operations or the suspending operations by a manipulation pole are difficult due to the heavier weight of the mending apparatus 14 than that of the inspection apparatus 7.

In the following, the process of the inspection and mending work is explained.

Firstly, presence of defects at the heat-affected zone near a weld line 64 is examined by the ultrasonic probe of the inspection apparatus 7. If any defect is detected, the position of the detected defect is measured and recorded as the place to be mended by the bellow-described method.

In the circular cylindrical coordinate (R, θ, Z) system, the origin point is set to the cross point of the curvature center axis of the circular arch formed by the track mechanism 6a and the vertical center axis of the track mechanism 6a. And the position of the θ coordinate is measured by the position sensor of the travel device 49 and the position of the Z coordinate by the position sensor of the Z direction drive mechanism 61. The position of the R coordinate is obtained from the distance between the face of the shroud and the track mechanism measured by using the ultrasonic wave signals emitted from the probe 52 and reflected by the face of the shroud.

The most outer position of the defect at the surface of the shroud is obtained by processing the data measured with the probe 52 of the inspection apparatus 7 and recorded as the most outer position of the R coordinate to be machined. Then, the recorded most outer position of the R coordinate to be machined and the recorded positions of the Z and the θ coordinate of the defect are input as the target positions into the mending control apparatus 16. Further, the value reduced by the predetermined constant s from the input target position of the R coordinate is again set as the target position of the R axis. To the above-mentioned target positions, the mending apparatus 14 is operated by automatically controlling the travel device 49 and the Z and R direction drive mechanisms. In the automatic position control of the mending apparatus 14, the position discrepancies caused by the difference between the shape of the inspection apparatus 7 and that of the mending apparatus 14 are corrected by input offset values of the initial positions.

Even in case the automatic position control is not done, the mending apparatus 14 can be easily and precisely positioned to the target position by remote manipulation of the mending apparatus 14 as comparing the present position with the target position.

And even in case the defect has the opening at the outside surface of the shroud and it can not be observed from the inside, the target position of the mending apparatus 14 can be easily determined by identifying the position of the defect with the inspection apparatus 7 using the ultrasonic probe, which realizes the maintenance integrating inspection and mending.

Further, even in case the life of the position sensors are extremely short due to their high irradiation environment and if the position sensors can keep their functions only during the positioning is done by the inspection apparatus and loses the functions after the positioning, the position to be mended can be determined on the basis of the recorded pulse number of each used step motor.

Other kinds of inspection methods are also applicable to the inspection apparatus besides the ultrasonic inspection method used in the embodiment. That is, the penetrant inspection method can be applied to the defect having the opening at the inside surface of the shroud and the eddy current inspection method to the defect not having the opening at the inside surface of the shroud.

In the above-mentioned embodiment, the system for inspection and mending in a reactor vessel by the present invention is applied to the maintenance executed in the region between the upper grid 3 and the core support plate 4. Naturally, the system for inspection and mending in the reactor vessel by the present invention is also applicable to the maintenance in the region between the core support plate 4 and a vessel end cover by fixing the support mechanisms 5c and 5d with the core support plate 4 and the control rod drive mechanism housings 10.

Generally, it is necessary to remove the guide tubes of the control rod drive mechanisms (not shown in the figure) existing between the core support plate 4 and the control rod drive mechanism housings 10 in inspecting and mending the structures such as the lower part of the shroud 2 under the core support plate 4, a shroud support 11, a shroud support leg 12 and so on. In case of applying the mending apparatus described in Japanese Patent Application Laid-Open No. 80186/1993, all the guide tubes of the control rod drive mechanisms must be removed. On the other hand, it is needed to remove only the guide tubes of the control rod drive mechanisms at the neighborhood of the shroud.

In another embodiment, the control rod drive mechanism housings 10, neutron monitor housings (not shown in the figure), etc., can be inspected and mended by lowering the track mechanism which is attached to the support mechanisms 5c and 5d supported with the core support plate 4 and the control rod drive mechanism housing 10, to the level of the upper face of the control rod drive mechanism housing 10.

As to the means for fixing the track mechanism, suction mechanisms with suction cups sticking to the inside face of the shroud can be also used in place of the support mechanisms, which realizes also the wide-ranging maintenance integrating inspection and mending although use of suction mechanisms makes it difficult to keep the horizontal position of the track mechanism.

In further another embodiment, the support mechanisms have the function capable of extension and contraction, and the track mechanism has the function of connecting and attaching the above-mentioned support mechanisms to the both terminals of the track mechanism so as each of the support mechanisms can be rotated on each of the both terminals of the track mechanism by remote operations. By the structure with the above-mentioned functions, it becomes possible that the whole of the track mechanism connected to the support mechanisms passes the hole of the upper grid.

Main advantages of the present invention are as follows.

The first advantage is that the inspection and the mending apparatus can be widely positioned with good reproducibility and without oscillation even in the maintenance of such an internal structure of the reactor vessel as the shroud having a narrow entrance hole of the upper grid and a wide internal space.

The second advantage of the present invention is that the mending apparatus can be precisely positioned at the mended place which is hardly monitored by visual observation and that the maintenance integrating inspection the mending is realized by the present invention.

What is claimed is:

1. a system for inspection and mending in a reactor vessel of a nuclear reactor, comprising:

a track mechanism; support mechanisms for supporting said track mechanism; an inspection apparatus traveling on said track mechanism; at least one mending apparatus traveling on said track mechanism; a setting mechanism for lowering all said above-described mechanisms and apparatuses in said reactor vessel, each of said track mechanism, said support mechanisms, said inspection apparatus and said mending apparatuses being composed so as to pass through a hole of an upper grid of a reactor core; and an installing mechanism for positioning said support mechanisms and said track mechanism at inside places of said reactor vessel by remote operations and for attaching said inspection apparatus and said mending apparatus to said same track mechanism by remote operations.

2. A system for inspection and mending in a reactor vessel of a nuclear reactor according to claim 1, wherein said track mechanism comprises at least two partial tracks, said partial tracks being connected to each other by a link or links and each of said links having an actuator for rotating said partial tracks connected to each other on each of said links.

3. A system for inspection and mending in a reactor vessel of a nuclear reactor according to claim 1, further comprising:

a control apparatus for calculating target positions of places to be mended by using inspection result data by said inspection apparatus and for positioning said mending apparatus at said calculated target positions of places to be mended; and wherein each of said support mechanisms is fixed with a hole of an upper grid and a hole of a core support plate.

4. A system for inspection and mending in a reactor vessel of a nuclear reactor according to claim 1, further comprising:

a control apparatus for calculating target positions of places to be mended by using inspection result data by said inspection apparatus and for positioning said mending apparatus at said calculated target positions of places to be mended; and wherein each of said support mechanisms is fixed with a core support plate and one of a plurality of internal structures below said core support plate.

5. A system for inspection and mending in a reactor vessel of a nuclear reactor according to claim 4, wherein said internal structures are housings for control rod drive mechanisms.

6. A system for inspection and mending in a reactor vessel of a nuclear reactor according to claim 3, wherein an ultrasonic inspection apparatus is used as said inspection apparatus.

7. A system for inspection and mending in a reactor vessel of a nuclear reactor according to claim 4, wherein an ultrasonic inspection apparatus is used as said inspection apparatus.

8. A system for inspection and mending in a reactor vessel of a nuclear reactor according to claim 5, wherein an ultrasonic inspection apparatus is used as said inspection apparatus.

9. A system for inspection and mending in a reactor vessel of a nuclear reactor according to claim 1, wherein said installing mechanism further includes a mechanism for disassembling said track mechanism, said inspection apparatus and said at least one mending apparatus so as to be taken out through said hole of said upper grid.

10. A system for inspection and mending in a reactor vessel of a nuclear reactor according to claim 9, wherein an ultrasonic inspection apparatus is used as said inspection apparatus.

11. A system for inspection and mending in a reactor vessel of a nuclear reactor according to claim 1, wherein the system is used for inspecting and mending a shroud of the reactor vessel.

12. A system for inspecting and mending in a reactor vessel of a nuclear reactor according to claim 9, wherein the system is used for inspecting and mending a shroud of the reactor vessel.

* * * * *